(12) United States Patent
Ploplys et al.

(10) Patent No.: US 9,291,708 B2
(45) Date of Patent: Mar. 22, 2016

(54) MULTIPLE HYPOTHESIS TRACKING USING MAXIMUM WEIGHT INDEPENDENT SET

(75) Inventors: Nicholas J. Ploplys, Redondo Beach, CA (US); Richard J. Kenefic, Fort Wayne, IN (US)

(73) Assignee: RAYTHEON COMPANY, Waltham, MA (US)

( * ) Notice: Subject to any disclaimer, the term of this patent is extended or adjusted under 35 U.S.C. 154(b) by 440 days.

(21) Appl. No.: 13/416,069

(22) Filed: Mar. 9, 2012

(65) Prior Publication Data
US 2013/0234882 A1 Sep. 12, 2013

(51) Int. Cl.
G01S 13/72 (2006.01)
G01S 15/66 (2006.01)
G01S 17/66 (2006.01)
G01S 7/295 (2006.01)

(52) U.S. Cl.
CPC .............. *G01S 13/726* (2013.01); *G01S 7/295* (2013.01); *G01S 15/66* (2013.01); *G01S 17/66* (2013.01)

(58) Field of Classification Search
CPC ................. G01S 13/72–13/726; G01S 13/66; G01S 7/295
USPC .......................................................... 342/96
See application file for complete search history.

(56) References Cited

U.S. PATENT DOCUMENTS

| | | | |
|---|---|---|---|
| 5,379,044 A | 1/1995 | Carlson et al. | |
| 5,396,252 A | 3/1995 | Kelly | |
| 5,414,643 A | 5/1995 | Blackman et al. | |
| 5,765,166 A | 6/1998 | Gotfried et al. | |
| 5,793,931 A * | 8/1998 | Hillis | 706/13 |
| 5,798,942 A * | 8/1998 | Danchick et al. | 342/96 |
| 5,909,189 A * | 6/1999 | Blackman et al. | 342/90 |
| 5,959,574 A * | 9/1999 | Poore, Jr. | 342/96 |
| 6,055,523 A | 4/2000 | Hillis | |
| 6,278,401 B1 * | 8/2001 | Wigren | 342/195 |
| 6,295,367 B1 | 9/2001 | Crabtree et al. | |
| 6,999,599 B2 | 2/2006 | Rui et al. | |
| 7,026,979 B2 * | 4/2006 | Khosla | 342/90 |
| 7,193,557 B1 | 3/2007 | Kovacich et al. | |
| 7,231,064 B2 | 6/2007 | Rui et al. | |
| 7,333,052 B2 * | 2/2008 | Maskell | 342/195 |
| 7,351,975 B2 * | 4/2008 | Brady et al. | 250/342 |
| 7,596,241 B2 | 9/2009 | Rittscher et al. | |
| 7,623,676 B2 | 11/2009 | Zhao et al. | |

(Continued)

OTHER PUBLICATIONS

Aarts et al. (eds.); "Local Search in Combinatorial Optimization"—Introduction; Princeton University Press; 9 pages (Originally Published by: John Wiley & Sons Ltd. in 1997)(ISBN: 0-691-11522-2) (2003).

(Continued)

*Primary Examiner* — Matthew M Barker
(74) *Attorney, Agent, or Firm* — Burns & Levinson LLP; Joseph M. Maraia

(57) ABSTRACT

The technology described herein includes a system and/or a method for multiple hypothesis tracking. In some examples, a multiple hypothesis tracking system includes a receiver, an array generation module, and a local search move module. The receiver is configured to receive tracking data associated with one or more target families from one or more sensors. The array generation module is configured to generate a matrix array based on the tracking data. The local search move module is configured to perform one or more local search moves on one or more cells in the matrix array to increase a global hypothesis score for the tracking data.

13 Claims, 4 Drawing Sheets

(56) References Cited

U.S. PATENT DOCUMENTS

| | | | |
|---|---|---|---|
| 7,626,535 | B2 | 12/2009 | Ding et al. |
| 7,750,840 | B2 | 7/2010 | Wood et al. |
| 7,757,086 | B2 | 7/2010 | Walmsley |
| 7,825,848 | B2 | 11/2010 | Schoettl |
| 7,983,878 | B1 | 7/2011 | Denis |
| 8,098,891 | B2 * | 1/2012 | Lv et al. .................... 382/103 |
| 8,515,881 | B2 * | 8/2013 | Schwoegler et al. ........... 706/12 |
| RE44,807 | E * | 3/2014 | Poore, Jr. ...................... 342/96 |
| 2002/0087361 | A1 | 7/2002 | Benigno et al. |
| 2003/0036835 | A1 | 2/2003 | Breed et al. |
| 2006/0028552 | A1 | 2/2006 | Aggarwal et al. |
| 2006/0268111 | A1 | 11/2006 | Zhang et al. |
| 2008/0002856 | A1 | 1/2008 | Ma et al. |
| 2008/0079629 | A1 | 4/2008 | Oka et al. |
| 2008/0101652 | A1 | 5/2008 | Zhao et al. |
| 2008/0144944 | A1 | 6/2008 | Breed |
| 2008/0169968 | A1 * | 7/2008 | Easthope et al. ................ 342/95 |
| 2009/0312985 | A1 | 12/2009 | Eliazar |
| 2012/0233098 | A1 * | 9/2012 | Schwoegler et al. ........... 706/12 |
| 2013/0275034 | A1 | 10/2013 | Cronin et al. |

OTHER PUBLICATIONS

Andrade et al.; "Fast Local Search for the Maximum Independent Set Problem"; Proceedings of 7th International Workshop on Experimental Algorithms (WEA 2008); C.C. McGeoch (Ed.); LNCS; 5038:220-234 [Springer, 2008].

Blackman et al.; "Design and Analysis of Modern Tracking Systems"; Publisher: Artech House, Dedham, MA [ISBN 1-58053-006-0]; 29 Pages [Excerpt] (1999).

DIMACS; "DIMACS Implementation Challenges"; [online—downloaded: Apr. 19, 2012][http://dimacs.rutgers.edu/ Challenges/]; 5 pages (2009).

Garey et al.; "Computers and Intractability: A Guide to the Theory of NP-Completeness"; W. H. Freeman and Company, New York; ISBN: 0-7167-1044-7; Chapter 3.1(3.1.3); pp. 53-56 (1979).

Glover et al.; "Tabu Search"; Kluwer Academic Publishers; ISBN: 0-7923-8187-4; Chapter 1, pp. 1-24; Sub-Chapters 8.6.3 - 8.6.4, pp. 289-290 (1997).

Hochbaum (ed.); "Approximation Algorithms for NP-Hard Problems"; PWS Publishing Company, Boston, MA, US; ISBN: 0-534-94968-1; Chapter 3(3.7); pp. 111-125 (1997).

Lozin et al.; "A Polynomial Algorithm to tind an Independent Set of Maximum Weight in a Fork-Free Graph"; DIMACS Technical Report 2005-38; Rutgers University (2005).

Popp et al.; "m-Best S-D Assignment Algorithm with Application to Multitarget Tracking"; IEEE Transactions on Aerospace and Electronic Systems; 37(1):22-39 (Jan. 2001).

Sharieh et al.; "An Algorithm for Finding Maximum Independent Set in a Graph"; European Journal of Scientific Research; 23(4):586-596 (2008).

Warrier et al.; "A Branch and Price Approach for the Maximum Weight Independent Set Problem"; Networks; 46 (14):198-209 (2005).

Samuel S. Blackman; Multiple Hypothesis Tracking for Multiple Target Tracking; IEEE A&E Systems Magazine; vol. 19; No. 1; Part 2: Tutorials—Blackman; pp. 5-18; Jan. 2004.

Matt L. Miller et al.; Optimizing Murty's Ranked Assignment Method; IEEE Transactions on Aerospace and Electronic Systems; vol. 33; No. 3; pp. 851-862; Jul. 1997.

Dimitri J. Papageorgiou et al.; The Maximum Weight Independent Set Problem for Data Association in Multiple Hypothesis Tracking; Optimization & Cooperative Ctrl. Strategies, LNCIS 381; pp. 235-255; 2009.

Evan Fortunato et al; Generalized Murty's Algorithm with Application to Multiple Hypothesis Tracking; The 10th International Conference on Information Fusion; 2007.

Chong et al., "Efficient Multiple Hypothesis Tracking by Track Segment Graph", Information Fusion 2009, Fusion '09, 12th International Conference on, IEEE, Piscataway, NJ USA, Jul. 6, 2009, pp. 2177-2184.

Hughes et al., "A Comparison of Semi-Greedy Multiple Hypothesis Methods in the Radar Data Association Problem", IEEE Aerospace Conference, Mar. 2014.

Cox et al., "An Efficient Implementation of Reid's Multiple Hypothesis Tracking Algorithm and its Evaluation for the Purpose of Visual Tracking", IEEE Transactions of Pattern Analysis and Machine Intelligence; vol. 18, No. 2, pp. 138-150; Feb. 1996.

Friman et al., "Multiple Hypothesis Template Tracking of Small 3D Vessel Structures;" Medical Image Analysis, vol. 14, No. 2, pp. 160-171, 2009.

* cited by examiner

MULTIPLE HYPOTHESIS TRACKING USING MAXIMUM WEIGHT INDEPENDENT SET

BACKGROUND

Multiple hypothesis tracking (MHT) is utilized to track multiple targets at the same time. MHT is generally described by Samuel S. Blackman in Multiple Hypothesis Tracking for Multiple Target Tracking, IEEE A&E Systems Magazine, Vol. 19, No. 1, January 2004, pages 5-18. In some scenarios, a plurality of targets is tracked via a track-oriented approach for hypothesis management which reconstitutes the global set of hypotheses from the list of tracks. The reconstitution of global hypotheses in the track-oriented approach is time consuming and the performance of this step significantly impacts MHT tracking performance. Furthermore, the reconstitution of global hypotheses within the track-based MHT is an NP-hard problem, and previous approaches (e.g., breadth-first search, depth-first search, etc.) are ad-hoc and do not provide performance guarantees. Also, current approaches to the reconstitution of the global hypotheses in the track-based MHT do not reliably find high ranking global hypotheses when the tracks are found in clusters with many families that contain singleton tracks (i.e., Type two clusters). In these situations, failure to find high ranking global hypotheses can lead to deletion of tracks in the best hypotheses and eventual loss of track on important targets. Thus, a need exists in the art for improved reconstitution of global hypotheses in track-based multiple hypothesis tracking.

SUMMARY

One approach to the reconstitution of global hypotheses in the track-based MHT is a system that formulates the problem as an instance of the maximum weight independent set problem (MWISP). The system includes a receiver configured to receive tracking data associated with one or more target families from one or more sensors. The system further includes an array generation module configured to generate a matrix array based on the tracking data. The system further includes a local search move module configured to perform one or more local search moves on one or more cells in the matrix array to increase a global hypothesis score for the tracking data.

Another approach to the reconstitution of global hypotheses in the track-based MHT is a method that formulates the problem as an instance of the maximum weight independent set problem (MWISP). The method includes (a) receiving tracking data associated with one or more target families from one or more sensors; (b) generating a matrix array based on the tracking data; (c) performing one or more local search moves on one or more cells in the matrix array to increase a global hypothesis score for the tracking data; and (d) repeating the performing step (c) based on the global hypothesis score.

Another approach to the reconstitution of global hypotheses in the track-based HMT is a computer program product that formulates the problem as an instance of the maximum weight independent set problem (MWISP). The computer program product is tangibly embodied in an information carrier. The computer program product includes instructions being operable to cause a data processing apparatus to: receive tracking data associated with one or more target families from one or more sensors; generate a matrix array based on the tracking data; and perform one or more local search moves on one or more cells in the matrix array to increase a global hypothesis score for the tracking data.

In other examples, any of the approaches above can include one or more of the following features.

In some examples, the one or more local search moves includes exchanging cells associated with a same target family in the matrix array, exchanging cells associated with different target families in the matrix array, removing a cell in the matrix array, and/or adding a cell in the matrix array.

In other examples, the system further includes a track identification module configured to identify a track for a target object based on the matrix array.

In some examples, the array generation module further configured to identify target families in the tracking data; and associate the identified target families with a cell in the matrix array.

In other examples, the system further includes a global hypothesis score configured to generate the global hypothesis score based on the matrix array.

In some examples, each target family in the one or more target families is associated with a target object.

In other examples, each associated target object is a ground vehicle, an air vehicle, a space vehicle, and/or a water vehicle.

In some examples, the one or more local search moves includes exchanging cells in the matrix array, removing a cell in the matrix array, and/or adding a cell in the matrix array.

In other examples, the cells in the matrix array are associated with a same target family.

In some examples, the generating step (b) further includes (b-1) converting the tracking data into a plurality of vertices. Each vertex in the plurality of vertices is associated with a target track.

In other examples, the performing step (c) further includes (c-1) generating the global hypothesis score based on the matrix array.

In some examples, each cell in the matrix cell array is associated with a target family in the one or more target families and each target family in the one or more target families is associated with one or more compatible target tracks.

In other examples, each target family in the one or more target families is associated with a target object.

In some examples, each associated target object is a ground vehicle, an air vehicle, a space vehicle, and/or a water vehicle.

The reconstitution of global hypotheses in the track-based MHT techniques described herein can provide one or more of the following advantages. An advantage to the technology is that the local search moves enable a fast and efficient grouping of tracks for identification of target objects in hypotheses, thereby reducing mis-identifications of target objects. Another advantage of the technology is that the organization of the tracks in a matrix array enables the tracks to be grouped together utilizing less processing time and less memory, thereby decreasing the overall track identification time. Another advantage of the technology is that a large number of tracks (e.g., hundreds, thousands, etc.) can be quickly processed to reduce the risk that a target object is not properly tracked, thereby increasing the efficiency of the technology.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
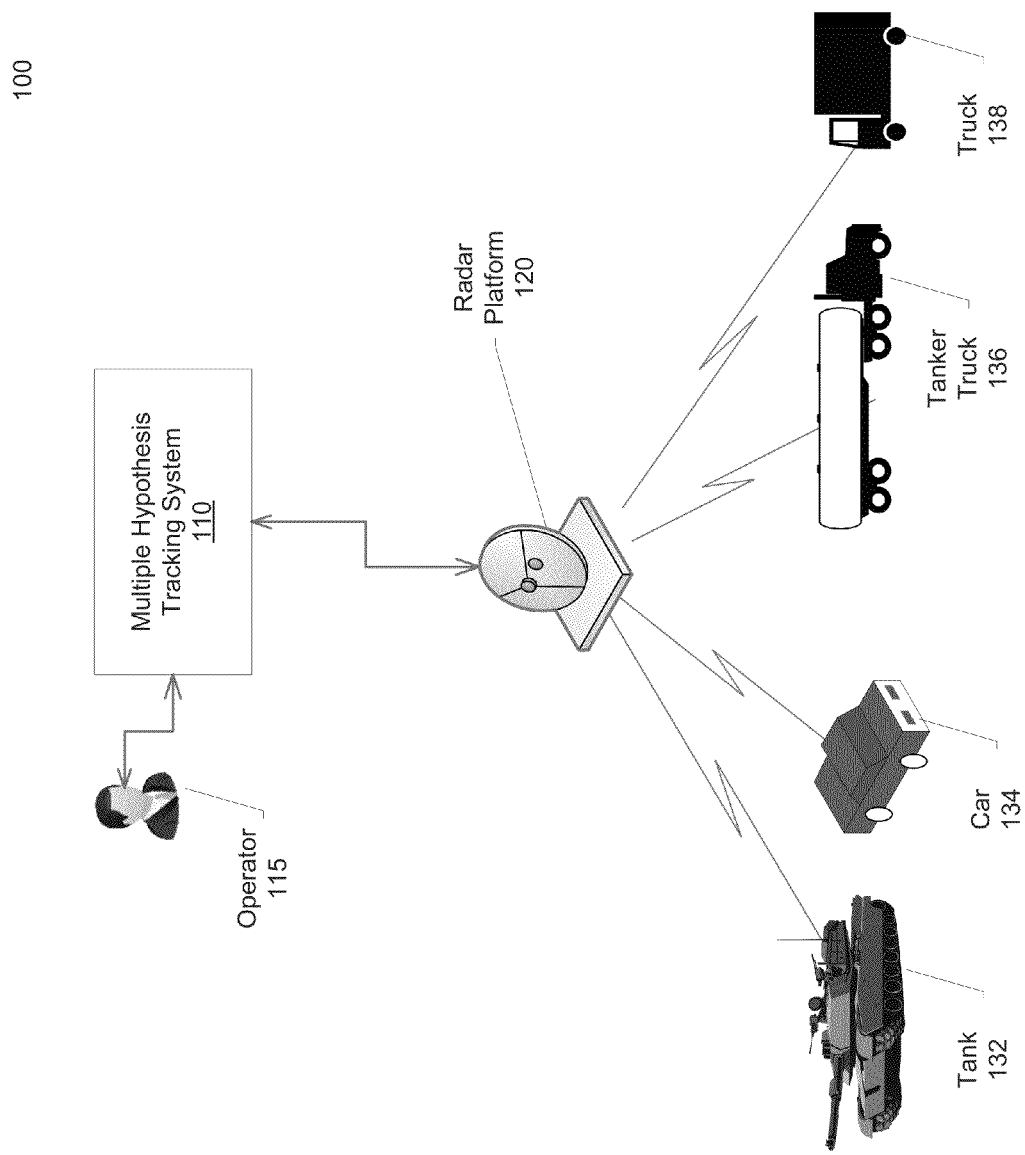
FIG. 1 is a diagram of an exemplary multiple hypothesis tracking environment.

The reconstitution of global hypotheses in the track-based multiple hypothesis tracking (MHT) method and apparatus includes technology that, generally, tracks sensor hits (also referred to as tracking data) (e.g., radar tracking, sonar tracking, etc.) to select a set of compatible hypotheses from clusters of hits. The reconstitution of global hypotheses in the track-based MHT can formulate the problem as an instance of the maximum weight independent set problem (MWISP). MWISP is generally described by D. V. Andrade, M. G. C. Resende, and R. F. Werneck in Fast Local Search for the Maximum Independent Set Problem, Proceedings of 7th International Workshop of Experimental Algorithms (WEA 2008), C. C. MGeoch (Ed.), LNCS, Vol. 5038, Springer, 2008, pages 220-234 and Dimitri J. Papageorgiou and Michael R. Salpukas in The Maximum Weight Independent Set Problem for Data Association in Multiple Hypothesis Tracking, Optimization and Cooperative Control Strategies, Michael Hirsch (Ed.), Springer, 2009. The technology is utilized to efficiently and accurately track multiple moving targets and the results of the technology (e.g., target object tracks, track identification, etc.) can be utilized for a plurality of applications (e.g., navigation, communication, defensive application, offensive application, etc.). The technology advantageously organizes and moves the tracking data utilizing a matrix array to minimize processing and memory requirements while decreasing the global hypothesis processing time. The global hypothesis processing time is the time that the technology takes to determine if a target object is on a particular track.

In operation, for example, the technology utilizes a matrix array of the clusters of hits to select the compatible hypotheses by performing one or more local search moves on the matrix array. The one or more local search moves enables the technology to achieve a higher overall global hypothesis score (e.g., most accurate tracking of targets, decreased missed target tracking probability, etc.), thereby increasing the probability that a target object is accurately being tracked by the technology. The one or more local search moves enables the technology to process a large amount of sensor data by applying moves to target families in a matrix array data structure, thereby decreasing the processing time and decreasing memory usage for the analysis of target tracks.

In general, the MHT process includes receiving new input observations (e.g., scans, data frames, etc.). The MHT process then includes the following steps. First, a gate determines whether to allow the new input observations. Second, the MHT process forms new tracks/hypotheses based on the input observations. Third, the MHT process evaluates and/or deletes a track/hypothesis based on the generation of global hypotheses. After the third step, the most likely hypotheses can be output to the user. Fourth, the surviving tracks/hypotheses are analyzed for track prediction and then the MHT process is repeated. The technology described herein is within the third step of the MHT process and generates the global hypotheses utilized to score/delete tracks. Although the MHT process is described as including these four steps, the MHT process can include any variety and/or type of processing techniques.

FIG. 1 is a diagram of an exemplary multiple hypothesis tracking environment 100. The environment 100 includes a multiple hypothesis tracking system 110 and a radar platform 120. An operator 115 views and/or tracks an object (in this example, a tank 132, a car 134, a tanker truck 136, and a truck 138) utilizing the multiple hypothesis tracking system 110. The radar platform 120 transmits and/or receives electromagnetic waves to track the objects and/or a plurality of other objects (not shown). For example, the radar platform 120 transmits electromagnetic waves over a period of time and receives the reflection of the electromagnetic waves from the tank 132 over the plurality of times. The radar platform 120 communicates data (e.g., digital representation of a radar reflection of the tank 132, processed data representation of the tank 132, etc.) to the multiple hypothesis tracking system 110.

In operation, for example, the multiple hypothesis tracking system 110 receives tracking data (e.g., raw radar data, pre-processed radar data, etc.) from the radar platform 120. The tracking data can be associated with one or more target families. Each target family can be associated with a particular target object (e.g., the tank 132, the car 134, etc.). In other examples, a particular target object is associated with a plurality of target families. In this example, the technology can identify the particular target object with a single target family utilizing any of the processes as described herein. Table 1 illustrates exemplary tracking data. The tracking data identifier can be utilized to identify a location of the stored tracking data.

TABLE 1

Exemplary Tracking Data

| Sensor | Target Family | Time | Tracking Data Identifier |
| --- | --- | --- | --- |
| Radar Platform 120 | Tank 132-A Family | 4:03.33 | ABC333 |
| Radar Platform 120 | Tank 132-B Family | 4:03.54 | ABC335 |
| Radar Platform B | Tank C Family | 4:04.22 | BDA444 |
| Radar Platform C | Tank C Family | 4:05.22 | GGL322 |

The multiple hypothesis tracking system 110 generates a matrix array based on the tracking data. In some examples, the multiple hypothesis tracking system 110 identifies the target families in the tracking data and associated the identified target families with a cell in the matrix array. The matrix array can enable the technology to quickly and efficiently perform local search moves to identify tracks for target objects. In other words, the matrix array is a data structure that decreases processing time by reducing the processing and memory overhead for reconstitution of the global hypotheses in track-based multiple hypothesis tracking Table 2 illustrates an exemplary matrix array.

TABLE 2

Exemplary Matrix Array for One Cluster

| | | | Family g | | |
| --- | --- | --- | --- | --- | --- |
| Family f | Cell A | Cell D | Cell D | Cell F | Cell E |
| | Cell B | Cell A | Cell D | Cell F | Cell E |
| | Cell B | Cell B | Cell A | Cell F | Cell E |
| | Cell F | Cell F | Cell F | Cell C | Cell E |
| | Cell F | Cell F | Cell F | Cell F | Cell A |

The cells in Table 2 include the following cells types where S represents the current global hypothesis upon which local search moves are to be performed to generate a global hypothesis with a higher score:

Cell A: Zero-tight—All tracks in {f} compatible with S-{f} OR A singleton family not in S compatible with S;

Cell B: Zero-tight (f AND g in S; g is not a singleton family);

Cell C: Singleton family in S;

Cell D: Zero-tight (f AND g in S; f is not a singleton family): All tracks in {f}, excluding the current track in S, compatible with S-{g};

Cell E: One-tight (f in S; g not in S): All tracks in {g} incompatible with the current {f} track in S and compatible with S-{f} OR {g} is a positive weight singleton incompatible with the current {f} track in S and compatible with S-{f}; and Cell F: All other cases.

The matrix array is utilized to enable the technology to quickly and efficiently determine the best tracking solutions (e.g., target A is on track B, target C is on track D, etc.).

In the exemplary Table 2 above, the solution set S can be represented as a vector. The multiple hypothesis tracking system 110 can partition the set S into families where each partition contains either one track selected from the family or zero if no track is selected. The multiple hypothesis tracking system 110 can store the 0-tight set in the matrix array that has been partitioned by families utilizing one or more of the following techniques:

Each cell on the main diagonal corresponding to a family with a track in S includes all tracks in a family that are 0-tight (i.e. compatible) with every track selected from the other families in the solution set S;

Each cell on the main diagonal corresponding to a family with no track in S includes all tracks that are 0-tight with every track in the solution set S;

The cell at (f,g), where families f and g are in the solution set and f is not a singleton family, includes all tracks in f that are 0-tight with S-{g};

The cell at (g,f), where f and g are in the solution and g is not a singleton family, includes all tracks in g 0-tight with S-{f};

The 1-tight set is stored in the matrix array that is partitioned by families. In this example, the rows represent families with a track in S and the columns represent the families that do not have a track in S;

The (f,g) cell entry includes all tracks in family g (this family has no track in S) that are 1-tight with the track in family f and 0-tight with all other tracks in S; and/or If g is a singleton family it has a positive track score.

Table 2 illustrates in an exemplary 0-tight and 1-tight structure as outlined above. The multiple hypothesis tracking system 110 can rebuilt the matrix array after each local search move as described herein. The technology can maintain the matrix array in a constant or linear time after each move, thereby enabling fast and effective updates to the matrix array.

The multiple hypothesis tracking system 110 performs one or more local search moves on one or more cells in the matrix array to increase a global hypothesis score (e.g., percentage, scaled amount, raw score, etc.) for the tracking data. The local search moves are faster and more efficient than other search techniques, thereby decreasing the processing time of the target tracking which decreases misses. In some examples, the multiple hypothesis tracking system 110 can perform local search moves until no further moves are possible (e.g., the global hypothesis score does not increase, the families are consolidated, etc.).

In some examples, the one or more local search moves include exchanging cells associated with a same target family in the matrix array (e.g., exchanging cell B with cell C, exchanging cell 3×4 with cell 7×5, etc.), exchanging cells associated with different target families in the matrix array, removing a cell in the matrix array, and/or adding a cell in the matrix array. In some examples, the multiple hypothesis tracking system 110 can perform local search moves in constant time and/or distributed over multiple families.

In other examples, the multiple hypothesis tracking system 110 can perform one or more of the following local search moves:

A (0, 1)-add for the highest score vertex in a family with no vertex in S that is compatible with every vertex in S. This move removes empty slots in S;—A (1, 1)-swap for any vertex in a family with any 0-tight vertex in the family that has a higher score. This move inserts a better target object match into the family;

A (1, k)-swap for any vertex in a family (with a track in S) with any k vertices (in different families not in S) that are 1-tight with it where the score of the added vertices is greater than the score of the deleted vertex and the k added vertices are compatible. The test for mutual compatibility takes linear time. This move inserts a better target object match into the family;

A (2, 2)-swap where the vertices in 2 families in S are exchanged for other vertices within the same families that have a higher combined score. This move inserts a better target object match into the family;

A (1, 2)-add where 2 tracks within a family are swapped to allow a singleton track (i.e., a family consisting of a single track) to be added. This move provides space for condensation of families; and/or A (2, 1)-delete where a singleton track is deleted so that a (1, 1)-swap within a family can be applied. In some examples, this move occurs where one of the families in the move is a singleton. This move provides space for condensation of families.

After the local search moves are complete, the multiple hypothesis tracking system 110 determines the ranking of the global hypotheses based on the matrix array and to score the tracks based on the ranking of the global hypotheses. The scoring of the tracks enables the multiple hypothesis tracking system 110 to identify a track for a target object (e.g., tank, airplane, etc.) based on the matrix array. The multiple hypothesis tracking system 110 can communicate the identification of the track for the target to any other systems (e.g., database storage system, vehicle guidance system, etc.) and/or devices. The identification of a track for a target object utilizing the local search moves advantageously enables a target object's track to be quickly and efficiently determined, thereby decreasing mis-identified target objects.

The multiple hypothesis tracking system 110 can generate the global hypothesis score based on the matrix array. For example, the multiple hypothesis tracking system 110 determines the ranking of the global hypotheses to determine the most likely set of targets from the tracks selected in the most likely global hypotheses.

In some examples, the each target object is a ground vehicle (e.g., tank, car, etc.), an air vehicle (e.g., blimp, plane, etc.), a space vehicle (e.g., space shuttle, satellite, etc.), and/or a water vehicle (e.g., boat, ship, submarine, etc.).

Although FIG. 1 illustrates the radar platform 120, the multiple hypothesis tracking system 110 can receive data from any type of sensor device (e.g., sonar, infrared, etc.). Although FIG. 1 illustrates the radar platform 120, the environment 100 can utilize any number of radar platforms (e.g., ten radar platforms, one hundred radar platforms, etc.). For example, the multiple hypothesis tracking system 110 can receive radar data from any number of radar platforms for the same object or different objects. In other examples, the radar platform 120 can include a plurality of radars and/or other types of sensor devices (e.g., motion sensor, environmental sensor, heat sensor, etc.).

Figure 2:
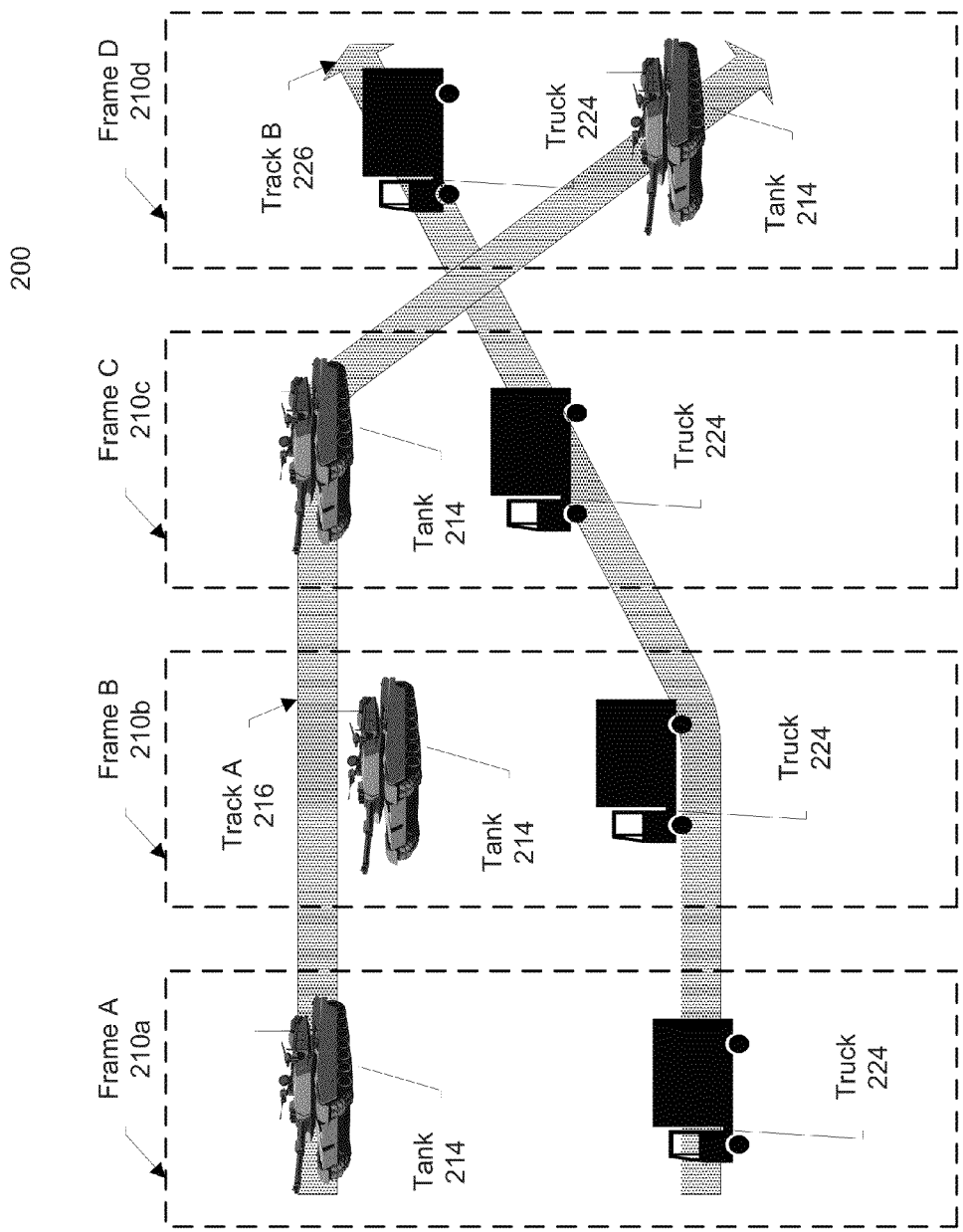
FIG. 2 is a diagram of another exemplary multiple hypothesis tracking environment.

FIG. 2 is a diagram of another exemplary multiple hypothesis tracking environment 200. The environment 200 illustrates tracking data at four times Frame A 210a, Frame B 210b, Frame C 210c, and Frame D 210d. A radar platform (not shown) tracks a tank 214 and a truck 224 through the four times (e.g., 4:03.23, 4:04.24, 4:05.43, 4:06.43). As illustrated in FIG. 2, the tank 214 proceeded along track A 216 and the truck 224 proceeded along track B 226. The tracks A 216 and B 226 intersect each other. The radar platform transmits and/or receives electromagnetic waves to track the tank 214 and the truck 224. The radar platform communicates data (e.g., digital representation of a radar reflection of the tank 214, processed data representation of the tank 214, etc.) to a multiple hypothesis tracking system (not shown).

The multiple hypothesis tracking system receives the tracking data from the radar platform. Using any of the processes as described herein, the multiple hypothesis tracking system can assign the truck 224 to the track B 226 and the tank 214 to the track A 216. The assignment of the target objects (in this example, the truck 224 and the tank 214) to the tracks enables the multiple hypothesis tracking system to properly track the target object. For example, in a navigation application, another truck is following the truck 224. In this example, the multiple hypothesis tracking system can properly distinguish the tracks so that the other truck properly follows the truck 224 instead of the tank 214 after the tracks A 216 and B 226 intersect.

Figure 3:
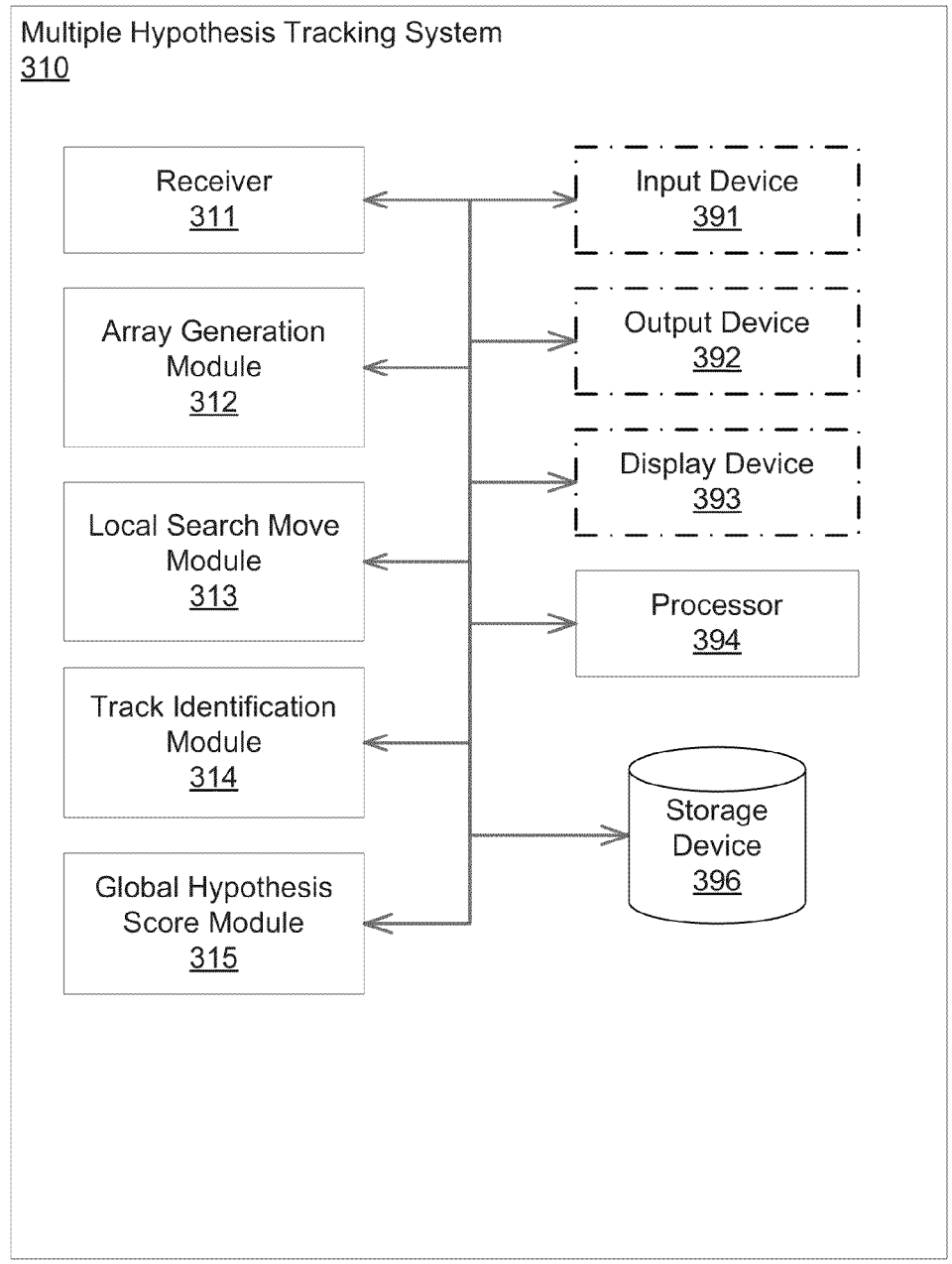
FIG. 3 is a block diagram of an exemplary multiple hypothesis tracking system.

FIG. 3 is a block diagram of an exemplary multiple hypothesis system 310. The radar system 310 includes a receiver 311, an array generation module 312, a local search move module 313, a track identification module 314, a global hypothesis score module 315, an input device 391, an output device 392, a display device 393, a processor 394, and a storage device 396. The modules and devices described herein can, for example, utilize the processor 394 to execute computer executable instructions and/or include a processor to execute computer executable instructions (e.g., an encryption processing unit, a field programmable gate array processing unit, etc.). It should be understood that the multiple hypothesis system 310 can include, for example, other modules, devices, and/or processors known in the art and/or varieties of the illustrated modules, devices, and/or processors. The input device 391, the output device 392, and/or the display 393 are optional components of the multiple hypothesis system 310. Although FIG. 3 illustrates the multiple hypothesis system 310 as including the separate modules described herein, the modules can be embedded within other modules (e.g., the array generation module 312 and the local search move module 313 are embedded within the global hypothesis score module 315). As described above, the MHT process can include a plurality of steps and the multiple hypothesis system 310 can include other modules (e.g., gate module, reconstitute hypotheses module, etc.) and devices configured to process the steps within the MHT process (e.g., the MHT process as described herein, another MHT process, etc.).

The receiver 311 receives tracking data associated with one or more target families from one or more sensors. The receiver 311 can include a transmitter and/or can operate as a transceiver. The array generation module 312 generates a matrix array based on the tracking data. In some examples, the array generation module identifies target families in the tracking data and/or associates the identified target families with a cell in the matrix array.

The local search move module 313 performs one or more local search moves on one or more cells in the matrix array to increase a global hypothesis score for the tracking data. The track identification module 314 identifies a track for a target object based on the matrix array. The global hypothesis score module 315 generates the global hypothesis score based on the matrix array.

In some examples, the one or more local search moves includes exchanging cells associated with a same target family in the matrix array, exchanging cells associated with different target families in the matrix array, removing a cell in the matrix array, and/or adding a cell in the matrix array. In other examples, each target family in the one or more target families is associated with a target object. In some examples, each associated target object is a ground vehicle, an air vehicle, a space vehicle, and/or a water vehicle.

The input device 391 receives information associated with the multiple hypothesis tracking system 310 (e.g., instructions from a user, instructions from another computing device, etc.) from a user (not shown) and/or another computing system (not shown). The input device 391 can include, for example, a keyboard, a scanner, etc. The output device 392 outputs information associated with the multiple hypothesis tracking system 310 (e.g., information to a printer (not shown), information to a speaker, etc.).

The display device 393 displays information associated with the multiple hypothesis tracking system 310 (e.g., status information, configuration information, etc.). In some examples, the display device 393 displays the target object track and/or any other information associated with the multiple hypothesis tracking system 310 to an operator. The processor 394 executes the operating system and/or any other computer executable instructions for the radar system 310 (e.g., executes applications, etc.).

The storage device 396 stores the received data (e.g., actual radar data, processed radar data, etc.), the identifications, and/or any other data associated with the multiple hypothesis tracking system 310. The storage device 396 can store image information and/or any other data associated with the multiple hypothesis tracking system 310. The storage device 396 can include a plurality of storage devices and/or the multiple hypothesis tracking system 310 can include a plurality of storage devices (e.g., a radar storage device, an identification storage device, etc.). The storage device 396 can include, for example, long-term storage (e.g., a hard drive, a tape storage device, flash memory, etc.), short-term storage (e.g., a random access memory, a graphics memory, etc.), and/or any other type of computer readable storage.

Figure 4:
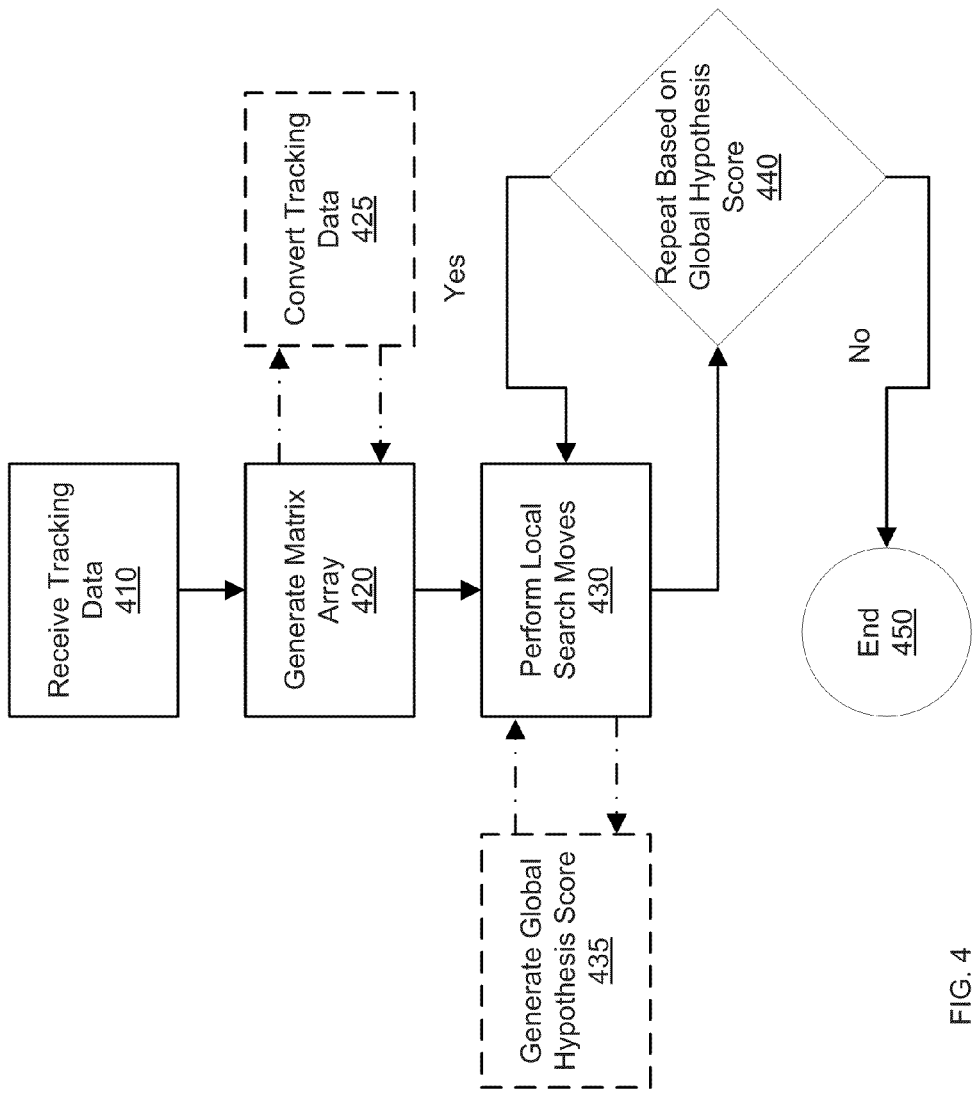
FIG. 4 is a flowchart of an exemplary multiple hypothesis tracking process.

FIG. 4 is flowchart of an exemplary multiple hypothesis tracking method, utilizing, for example, the multiple hypothesis tracking system 110 of FIG. 1. The multiple hypothesis tracking system 110 receives (410) tracking data associated with one or more target families from one or more sensors. The multiple hypothesis tracking system 110 generates (420) a matrix array based on the tracking data. The multiple hypothesis tracking system 110 performs (430) one or more local search moves on one or more cells in the matrix array to increase a global hypothesis score for the tracking data. The multiple hypothesis tracking system 110 determines (440) if the performing (430) should be repeated based on the global hypothesis score (e.g., below a pre-defined threshold, above a dynamic threshold, etc.). The multiple hypothesis tracking system 110 continues the performing (430) one or more local search moves on one or more cells in the matrix array to increase a global hypothesis score for the tracking data until the determination (440) step is satisfied. If the determination (440) step is satisfied, the processing ends (450).

In some examples, the multiple hypothesis tracking system 110 converts (425) the tracking data into a plurality of vertices. Each vertex in the plurality of vertices is associated with a target track.

In other examples, the multiple hypothesis tracking system 110 generates (435) the global hypothesis score based on the matrix array. The multiple hypothesis tracking system 110 can generate (435) the global hypothesis score based on each iteration of the local search moves to the matrix array.

In some examples, the multiple hypothesis tracking system 110 performs (430) the local search moves in parallel. In other words, the multiple hypothesis tracking system 110 can perform any number of local search moves (e.g., ten, twenty, one hundred, etc.) simultaneously. In other examples, the multiple hypothesis tracking system 110 identify a first cell to perform a local search move randomly (e.g., any cell, any cell in the largest family, etc.) and/or utilizing another technique (e.g., breadth-first search, depth-first search, etc.).

In other examples, the multiple hypothesis tracking system 110 can perform (430) local search moves until no more families are available for processing (e.g., all family tracks are full, every family has been processed, etc.). In some examples, the multiple hypothesis tracking system 110 can perform (430) local search moves until no further moves are available for a better tracking solution.

In some examples, the one or more local search moves include exchanging cells in the matrix array (e.g., to find a better track), removing a cell in the matrix array (e.g., to remove a bad track), and/or adding a cell in the matrix array (e.g., to add a missing track). In other examples, the cells in the matrix array are associated with a same target family. In some examples, each cell in the matrix cell array is associated with a target family in the one or more target families and each target family in the one or more target families is associated with one or more compatible target tracks. In other examples, each target family in the one or more target families is associated with a target object. In some examples, each associated target object is a ground vehicle, an air vehicle, a space vehicle, and/or a water vehicle.

In some examples, a breadth first search (BFS) is unable to exhaustively enumerate the hypothesis tree due to the large size of the tree. In this example, two options for the use of the technology were utilized in a ground tracking scenario with 300, 400, or 500 targets. In the first option, one pass of the local search (as described herein) was performed on the best hypothesis returned by BFS (MWIS(1)), and if a better global hypothesis was found it was added to the list of global hypotheses for computing the track scores. In the second option, ten random local search starts were performed (MWIS(10)), and all hypotheses found that scored better than the best BFS hypothesis were added to the hypothesis list for computing track scores. The results are shown in Table 3. The clusters generated in the ground tracking scenario are of Type 1, but the MWIS(1) heuristic offers improvements in metrics, including track purity, track duration, and target effectiveness, for a small increase in computational load. In the examples illustrated in Table 3, the average time to confirm a target was faster for the technology than for BFS only. A "Type 1" cluster includes many tracks distributed over a small number of families. In the case of a Type 1 cluster, since the solution set S depends on the number of families, S is small and the number of global hypotheses is generally manageable. A "Type 2" cluster includes many tracks distributed over a large set of families where many of the families contain a single track. In the case of a Type 2 cluster, S is large, and the number of global hypotheses is generally too large to be determined in a finite amount of time (grows exponentially with the number of families).

TABLE 3

Exemplary Ground Tracking Results

| | Targets | | | | | |
|---|---|---|---|---|---|---|
| | 300 | | | 400 | | |
| Metric | BF only | BF + MWIS(1) | BF + MWIS(10) | BF only | BF + MWIS(1) | BF + MWIS(10) |
| Total Num Tgt Obs in All Utracks: | 8326 | 8402 | 8399 | 8877 | 9117 | 9186 |
| Total Num Obs in All Utracks: | 8926 | 8934 | 8933 | 9975 | 9975 | 9987 |
| Total Num FA Obs in All Utracks: | 7 | 8 | 7 | 14 | 14 | 14 |
| Total Tgt Obs in System: | 8966 | 8966 | 8966 | 10039 | 10039 | 10039 |
| Total Num Obs in System: | 9446 | 9446 | 9446 | 10519 | 10519 | 10519 |
| Associated Tgts/Total Tgts: | 8919/8966 | 8926/8966 | 8926/8966 | 9961/10039 | 9961/10039 | 9973/10039 |
| Average Utrack Purity: | 0.93537 | 0.943037 | 0.942271 | 0.897759 | 0.917442 | 0.924131 |
| Average Utrack Duration: | 96.372483 | 96.402685 | 96.432886 | 88.975741 | 89.86413 | 90.759563 |
| Average Num Tgt Obs in Utracks: | 27 | 28 | 28 | 23 | 24 | 25 |
| Average Target Effectiveness: | 0.918455 | 0.924952 | 0.923611 | 0.861257 | 0.881392 | 0.881422 |
| Average Time To Confirm A Target: | 18.428094 | 17.662207 | 17.685619 | 17.283379 | 17.228883 | 17.634877 |
| Hypothesis Formation Processing: | A | (1.074) A | (1.444) A | B | (1.171) B | (2.622) B |

| | Targets 500 | | |
|---|---|---|---|
| Metric | BF only | BF + MWIS(1) | BF + MWIS(10) |
| Total Num Tgt Obs in All Utracks: | 10986 | 11312 | 11401 |
| Total Num Obs in All Utracks: | 12704 | 12722 | 12723 |
| Total Num FA Obs in All Utracks: | 12 | 14 | 13 |
| Total Tgt Obs in System: | 12804 | 12804 | 12804 |
| Total Num Obs in System: | 13284 | 13284 | 13284 |

TABLE 3-continued

Exemplary Ground Tracking Results

| | | | |
|---|---|---|---|
| Associated Tgts/Total Tgts: | 12692/12804 | 12708/12804 | 12710/12804 |
| Average Utrack Purity: | 0.875451 | 0.894082 | 0.902252 |
| Average Utrack Duration: | 88.066667 | 89.027957 | 89.601732 |
| Average Num Tgt Obs in Utracks: | 23 | 24 | 24 |
| Average Target Effectiveness: | 0.854984 | 0.868976 | 0.87477 |
| Average Time To Confirm A Target: | 17.605603 | 18.303879 | 18.015086 |
| Hypothesis Formation Processing: | C | (1.584) C | (3.193) C |

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A multiple hypothesis tracking apparatus for identifying accurate track hypotheses for one or more moving target objects from tracking data acquired by a radar, sonar or optical sensor, the apparatus comprising:
   a receiver configured to receive tracking data associated with one or more target object families from one or more radar, sonar or optical sensors;
   an array generation processor configured to generate a matrix array using the tracking data, wherein each cell in the matrix array is associated with a subject target object family of the one or more target object families identified in the tracking data;
   a global hypothesis score processor configured to generate a global hypothesis score using the matrix array, the global hypothesis score providing an indication of the tracking accuracy of the one or more target object families by the apparatus;
   a local search move processor configured to perform one or more local search moves on one or more cells in the matrix array to increase the global hypothesis score for the tracking data, wherein the one or more local search moves includes at least one of: exchanging cells, removing a subject cell, adding at least one cell in the matrix array; and
   a track identification processor configured to identify a track for a target object based on the matrix array.

2. The apparatus of claim 1, wherein the one or more local search moves comprises exchanging cells associated with a same target object family in the matrix array, exchanging cells associated with different target object families in the matrix array, removing a cell in the matrix array, adding a cell in the matrix array, or any combination thereof.

3. The apparatus of claim 1, wherein the array generation processor is further configured to:
   identify target object families in the tracking data; and
   associate the identified target object families with a cell in the matrix array.

4. The apparatus of claim 1, wherein each target object family in the one or more target families is associated with a target object.

5. The apparatus of claim 4, wherein each associated target object is a ground vehicle, an air vehicle, a space vehicle, a water vehicle, or any combination thereof.

6. In a multiple hypothesis tracking apparatus, a method for identifying accurate track hypotheses for one or more moving target objects from tracking data acquired by a radar, sonar or optical sensor, the method executed by one or more processors and comprising:
   receiving, at a receiver, tracking data associated with one or more target object families from one or more radar, sonar or optical sensors;
   generating, by one or more processors comprising the apparatus, a matrix array based on the tracking data, wherein each cell in the matrix array is associated with a subject target object family of the one or more target object families identified in the tracking data, and a global hypothesis score using the matrix array, the global hypothesis score providing an indication of the tracking accuracy of the one or more target object families by the apparatus;
   performing, by the one or more processors, one or more local search moves on one or more cells in the matrix array to increase the global hypothesis score for the tracking data, wherein the one or more local search moves includes at least one of: exchanging cells, removing a subject cell, adding at least one cell in the matrix array; and
   identifying a track for a target object based on the matrix array.

7. The method of claim 6, wherein the one or more local search moves comprises exchanging cells in the matrix array, removing a cell in the matrix array, adding a cell in the matrix array, or any combination thereof.

8. The method of claim 7, wherein the cells in the matrix array are associated with a same target object family.

9. The method of claim 6, wherein the generating step further comprises converting, by the one or more processors, the tracking data into a plurality of vertices, each vertex in the plurality of vertices is associated with a target object track.

10. The method of claim 6, wherein each cell in the matrix cell array is associated with a target object family in the one or more target object families and each target object family in the one or more target object families is associated with one or more compatible target object tracks.

11. The method of claim 6, wherein each target object family in the one or more target object families is associated with a target object.

12. The method of claim 11, wherein each associated target object is a ground vehicle, an air vehicle, a space vehicle, a water vehicle, or any combination thereof.

13. A non-transitory computer program product, tangibly embodied in a non-transitory information carrier, the computer program product including instructions being operable to cause a multiple hypothesis tracking apparatus coupled to one or more radar, sonar or optical sensors and including a data processing apparatus, that when executed by the data processing apparatus, cause the data processing apparatus to:
   receive tracking data associated with one or more target object families from one or more radar, sonar or optical sensors;
   generate a matrix array using the tracking data, wherein each cell in the matrix array is associated with a subject target object family of the one or more target object families identified in the tracking data;
   generate a global hypothesis score using the matrix array, the global hypothesis score providing an indication of the tracking accuracy of the one or more target families by the data processing apparatus; and
   perform one or more local search moves on one or more cells in the matrix array to increase the global hypothesis score for the tracking data, wherein the one or more local search moves includes at least one of: exchanging cells, removing a subject cell, adding at least one cell in the matrix array; and
   identify a track for a target object based on the matrix array.

* * * * *